Patented Nov. 3, 1925.

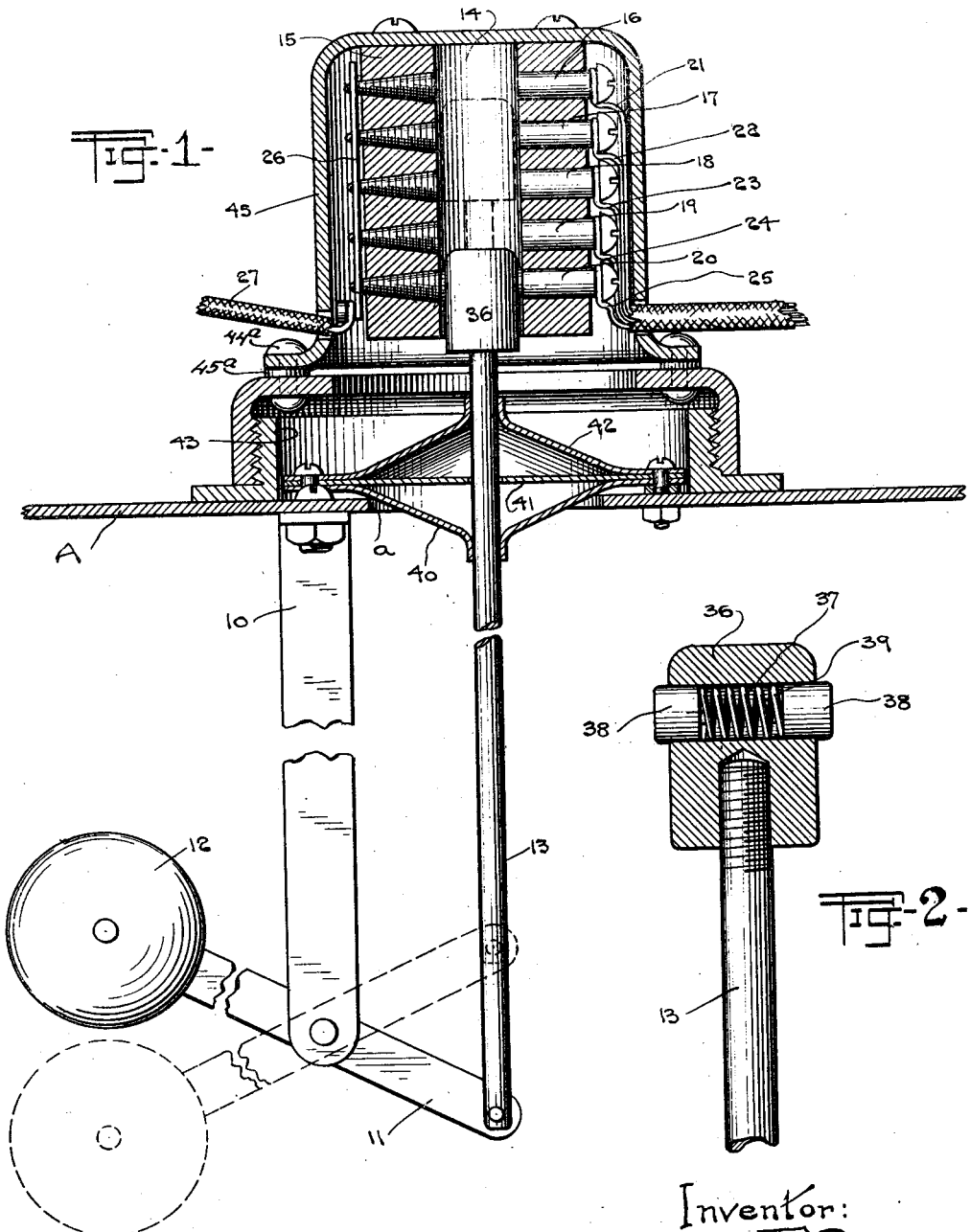

1,560,318

UNITED STATES PATENT OFFICE.

WALTER F. REED, OF CHICAGO, ILLINOIS.

GASOLINE-TANK GAUGE.

Application filed January 6, 1922. Serial No. 527,456.

*To all whom it may concern:*

Be it known that I, WALTER F. REED, a citizen of the United States, residing at Chicago, in the county of Cook and State of Illinois, have invented new and useful Improvements in Gasoline-Tank Gauges, of which the following is a full, clear, and exact description.

My invention relates to gasoline tank gauges and particularly gauges for tanks for automobiles.

Gasoline tank gauges for automobiles have been made in which, in order to ascertain the quantity of gasoline in the tank, it was necessary for the tank to be inspected, and there have been gauges of this kind that could be placed on the dashboard and viewed by the chauffeur that consisted of a graduated dial and a movable hand pointing to said graduations indicating the quantity of gasoline in the tank. The last mentioned gauges, however, although on the instrument-board must be examined with a light at night.

The object of my invention is to provide a cluster of small lights that are lighted one after the other in succession, which are, preferably, placed on the instrument-board and can be read to enable the gauge to be quickly and accurately read either in the daylight or in darkness, and which can be placed in the flashlight of said board, if desired.

This I accomplish by the means hereinafter fully described and as particularly pointed out in the claims.

In the drawings:

Figure 1 is a longitudinal section of a portion of the tank, showing my improvements applied thereto, and drawn to a larger scale.

Figure 2 is a longitudinal section of a switch used in connection with my improvements.

In the drawings A represents a gasoline tank that is generally placed at the rear end of the body B, of an automobile. This tank is of any particular design and may be located at the rear of the body or under the instrument-board thereof, or anywhere else, if desired. The tank is provided with a suitable opening $a$ in its top, and it has a hanger 10, secured to and projecting downwards from the margins of this opening in the top, that consists of one or more bars, that depend to about the center of depth of the tank, and have a straight float-lever 11 pivoted thereto. At the longer end of said lever there is a cork-float 12, and at the shorter end thereof there is a vertically arranged plunger 13 pivotally connected to it. This plunger 13, preferably, comprises a cylindrical rod that extends centrally up through the center of said opening $a$, and terminates in the vertical bore 14 of a cylinder 15 of insulating material.

The cylinder 15, has, say, five copper screws, 16, 17, 18, 19, and 20 tapped transaxially through it, so that the heads of the screws do not touch but are slightly removed from the outside of the cylinder and provide binding-posts for separate insulated wires, 21, 22, 23, 24, and 25, that are separately attached thereto. The opposite screw-threaded ends of these screws, project beyond the opposite side of the cylinder and screw into a common connecting-plate 26. The cylinder is then bored out centrally to provide the bore 14, and separate each screw into two sections.

A wire 27 is connected to and extends from plate 26, and has a battery 28 closed thereto. From this battery the wire extends to and is connected to a metal ring 29, axially mounted in the ends of the casing 30 of a lamp or dashlight, that has within it suitable equi-distantly placed sockets 51, 51, for the bases of the electric bulbs 31, 31. Each of said sockets have therein a contact 48 at the ends of the wires 21, 22, 23, 24, and 25, respectively, and when the head section of a screw is electrically connected to its complemental screw-threaded negative end, (from which they are normally separated by the bore of the cylinder), the light from the bulb to which the particular wire is connected, will glow.

The upper end of the plunger 13, is provided with a piston 36, that is, preferably, made of appropriate material, and is provided with a transaxially opening 37. The ends of this opening have metal contacts 38, 38, placed therein, that are forced apart by a coil-spring 39, placed in said opening between them. As the plunger is moved up or down the contacts 38 connect the positive and negative sections of the screws, in succession, and close the circuit with which each screw is connected.

The opening $a$, up through which the plunger passes out of the tank, has a concavo-convex disc 40 placed therein, that is of greater diameter than the opening and has its margins lapping over and secured to the margins of the opening, so that its central perforation will permit the passage of and guide the plunger. Above this disc 40, is a circular washer 41, that is concentric thereto and has a central aperture to permit the passage of the plunger, and above this washer is a concentrically arranged convexo-concave disc 42, that is arranged so that its central aperture guides the plunger, 13.

These discs and washer are secured in substantially the place mentioned, by screws or rivets tapped through their lapping edges into the top of the tank, and keep the gasoline from flowing up into the cylinder.

Concentric to the two discs and washer, just mentioned is a circular stub 43, that is L-shaped in cross-section and has its flange lap against and suitably secured to the top of the tank. Screwed upon the stub is an inverted L-shaped annulus 44 the upper edge of which is flanged inwards, and riveted to this flange by means of rivets 44ᵃ passing through its lower outwardly projecting flange is the cylindrical casing 45. Washers 45ᵃ surround the rivets 44ᵃ between the flanges of this annulus and casing and permit a circulation of air between the same that dissipates and prevents the ignition of any gas that might leak up from the tank. This casing, 45, extends upward and is of such diameter that, its sides enclose but are out of touch with the cylinder 15. The upper end of the cylinder is screwed to the closed top of the casing, which latter has openings, preferably, in its side, out through which wires 21, 22, 23, 24, and 25, and wire 27 from plate 26, pass to the outside.

The wires 21, 22, 23, 24, 25, and 27 are insulated preferably, in one cable and extend from casing 45 to the instrument-board C, and then into the cylindrical case 30, of a dash-light 47, to the free end of the same, and are, respectively, attached to the socket x of electric bulbs 52, and these bulbs 52, 52, have contacts at the ends of their bases, in the usual manner, that engage suitable negative contacts 29. These bulbs, are, preferably, secured back of the head 49 in the free end of the dash-light, and this head has a series of red glass crystals or jewels, 51, as hereinbefore set forth, that are arranged in alinement with the bulbs, and when the latter are separately lit, will cast a conspicuous red light that will be readily observed in the dark.

What I claim as new is:

The combination with a tank, a lever fulcrumed therein, a float at one end thereof, and a reciprocal plunger pivoted thereto at the other end, a block of insulating material, a series of screws tapped therethrough, and each separated into two sections by a bore through said block, laterally projected contacts carried by the plunger, a plate connecting the outer ends of the other sections, and constituting the common terminals of the opposite ends of said contacts said plunger connecting said terminals.

In witness whereof I have hereunto set my hand and seal this third day of January, 1922.

WALTER F. REED.